(12) United States Patent
Vignoli

(10) Patent No.: US 8,943,880 B2
(45) Date of Patent: Feb. 3, 2015

(54) DEVICE AND A METHOD FOR OBTAINING INFORMATION ABOUT A WHEEL

(75) Inventor: Giuliano Vignoli, Modena (IT)

(73) Assignee: Societa' Italiana Costruzioni Elettromeccaniche-S.I.C.E. S.p.A., Correggio (Reggio Emilia) (IT)

( * ) Notice: Subject to any disclaimer, the term of this patent is extended or adjusted under 35 U.S.C. 154(b) by 1249 days.

(21) Appl. No.: 12/503,368

(22) Filed: Jul. 15, 2009

(65) Prior Publication Data

US 2010/0013913 A1    Jan. 21, 2010

(30) Foreign Application Priority Data

Jul. 15, 2008   (IT) .............................. RE2008A0067

(51) Int. Cl.
```
G01M 17/02     (2006.01)
B60C 25/05     (2006.01)
B60C 25/138    (2006.01)
G01M 17/013    (2006.01)
```
(52) U.S. Cl.
CPC ......... *G01M 17/027* (2013.01); *B60C 25/0554* (2013.01); *B60C 25/138* (2013.01); *G01M 17/013* (2013.01)

USPC .......................................................... 73/146

(58) Field of Classification Search
CPC ........................... G01M 17/027; B60C 25/138
USPC ............................................... 348/61; 73/146
IPC ................................... H04N 7/18; G01M 17/02
See application file for complete search history.

(56) References Cited

U.S. PATENT DOCUMENTS

| | | | |
|---|---|---|---|
| 6,367,884 B1 | 4/2002 | Fogal et al. | |
| 2004/0165180 A1* | 8/2004 | Voeller et al. | ............ 356/139.09 |
| 2005/0052637 A1 | 3/2005 | Shaw et al. | |
| 2008/0202229 A1 | 8/2008 | Maehner et al. | |
| 2010/0170331 A1* | 7/2010 | Maehner et al. | ................. 73/146 |

FOREIGN PATENT DOCUMENTS

DE   10 2007 009040 B3   5/2008

* cited by examiner

*Primary Examiner* — Jay Patel
*Assistant Examiner* — Yulin Sun
(74) *Attorney, Agent, or Firm* — Browdy and Neimark, PLLC

(57) ABSTRACT

A device and a method for obtaining information about a wheel, the device including a penetrating body for at least partially inserting between a tire and a rim of a wheel, and a unit for acquiring the images, the unit being installed on a portion of the penetrating body which is designed to be positioned in an internal space between the tire and the rim.

11 Claims, 6 Drawing Sheets

DEVICE AND A METHOD FOR OBTAINING INFORMATION ABOUT A WHEEL

FIELD

The present invention is a device and method for obtaining information about a wheel, for example to verify a rim profile, the internal wear of a tire or any damage to the tire and/or the tire bead.

BACKGROUND

The prior art includes numerous automatic devices, both optical and mechanical, that are capable of reading the external characteristics of a wheel, among which for example the external rim profile or the external shape of the tread or tire sidewalls in order to identify any damage or to obtain useful information for improved wheel balancing or tire fitting.

However, none of these devices is capable of providing information regarding the internal state of the wheel, for example the internal rim profile or the internal wear of the tire, without demounting the tire from the rim.

SUMMARY

The aim of the present invention is to obviate this limitation, by way of a simple, rational, and economic solution.

This aim is achieved by the characteristics of the invention as described in the independent claims. The dependent claims delineate preferred and/or particularly advantageous aspects of the invention.

In particular, the invention provides a device comprising a penetrating body for at least partial insertion between the tire and the rim on which the tire is mounted, and means acquiring images, the means being installed on a portion of the penetrating body designed to be positioned between the tire and the rim.

In this way the device of the invention can be effectively used for acquiring images of the inside of a wheel, the images making it possible to assess the internal condition of the rim and/or of the tire without the need to demount the tire from the rim.

The device can consequently be applied to numerous purposes, including for example identification of an internal rim profile, or presence of pressure-controlling devices, internal wear of a tire, or any damage to a tire or bead caused during the mounting procedure. The device can also be associated to a tire service machine, for example a tire changing machine, with the aim of establishing methods for bead breaking, demounting, and mounting of tires.

For example the device can be used to automatically move mounting/demounting tools on the basis of internal profiles of the rim and of the tire.

In a general sense the invention also provides a method for checking the condition of a tire, which generically comprises stages of at least partially inserting the penetrating body between the tire and the rim on which the tire is mounted, and acquiring internal images using a means for acquiring equipped on the penetrating body.

BRIEF DESCRIPTION OF THE DRAWINGS

Further characteristics and advantages of the invention will better emerge from the detailed description made herein, provided by way of non-limiting example in the accompanying figures of the drawings.

DETAILED DESCRIPTION

Figure 4:
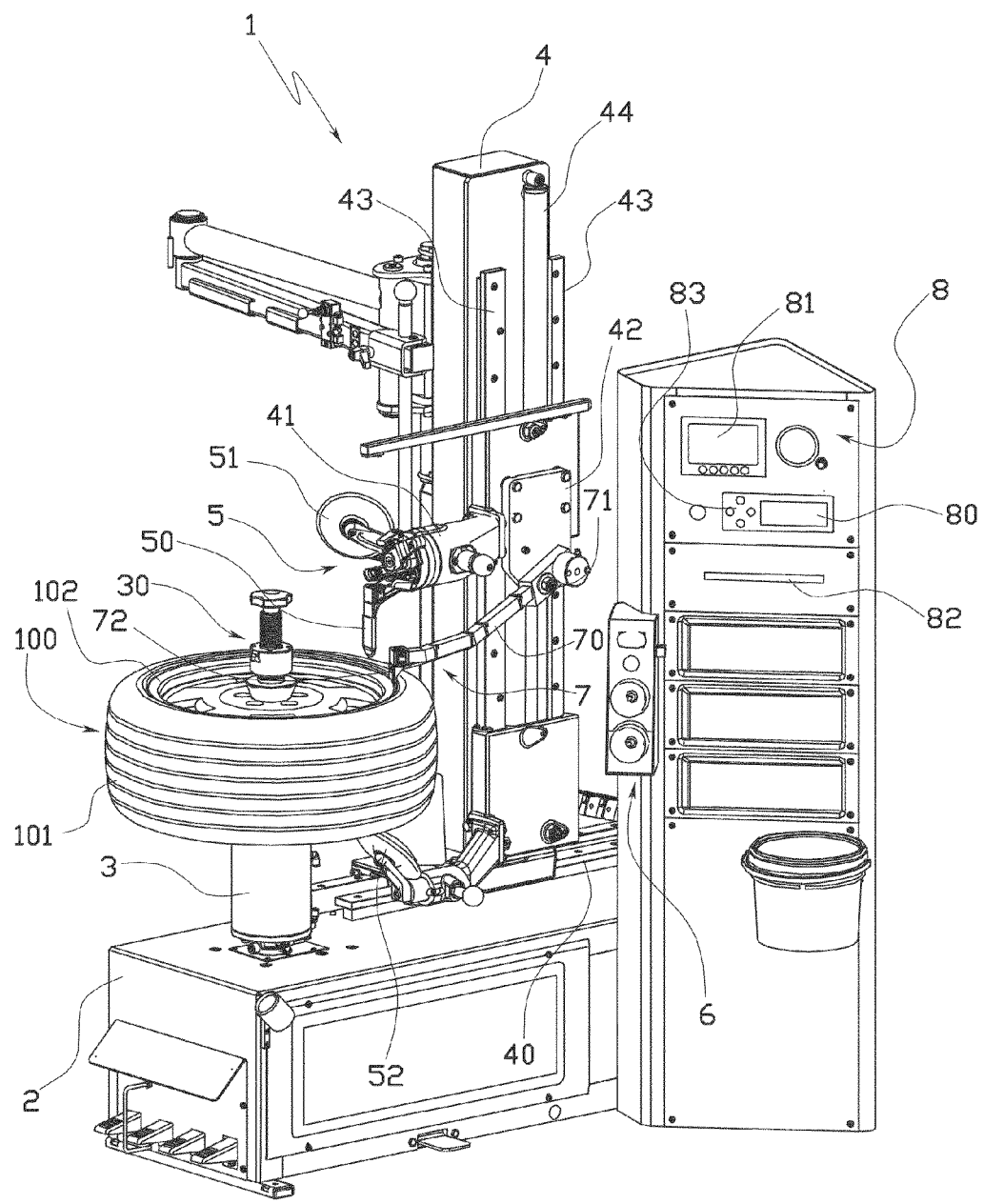
FIG. 4 is a prospective view of the tire changing machine of FIG. 1 during operation.

The tire changing machine 1 comprises a base 2 on which a vertical-axis rotor 3 is fitted with associated means 30 for supporting and blocking a wheel 100 (see FIG. 4).

The base is also fitted with a vertical column 4 coupled to a straight horizontal guide 40 on which the column 4 can slide when driven by a drive mechanism (not visible), such as to be moved in a horizontal direction towards/away from the wheel-bearing rotor 3.

The vertical column 4 supports a horizontal axis tool arm 41, with an operating head 5 fitted on the extremity and provided with normal tire changing tools 50 and a bead breaking disc 51, which are located in diametrically opposite positions relative to the axis of the arm 41.

The operating head 5 can be rotated around the axis of the tool arm 41, such as to rotate the tire demounting tool 50 or alternatively the bead breaking disc 51 to face the wheel 100.

The tool arm 41 is fitted on a carriage 42, coupled to the upright 4 with two vertical straight guides 43 on which the tool arm 41 can be made to slide using a jack 44 such as to raise or lower the operating head 5 relative to the wheel 100.

The tire changing machine 1 is provided with manual controls, typically levers or buttons, which are globally referenced as 6 and permit operators to activate the drive mechanisms that move the column 4 on the base 2 and the carriage 42 on the column 4.

The tire changing machine is of known type and is not described in further detail herein.

The sliding carriage 42 is also equipped with a device 7 of the invention.

Figure 1:
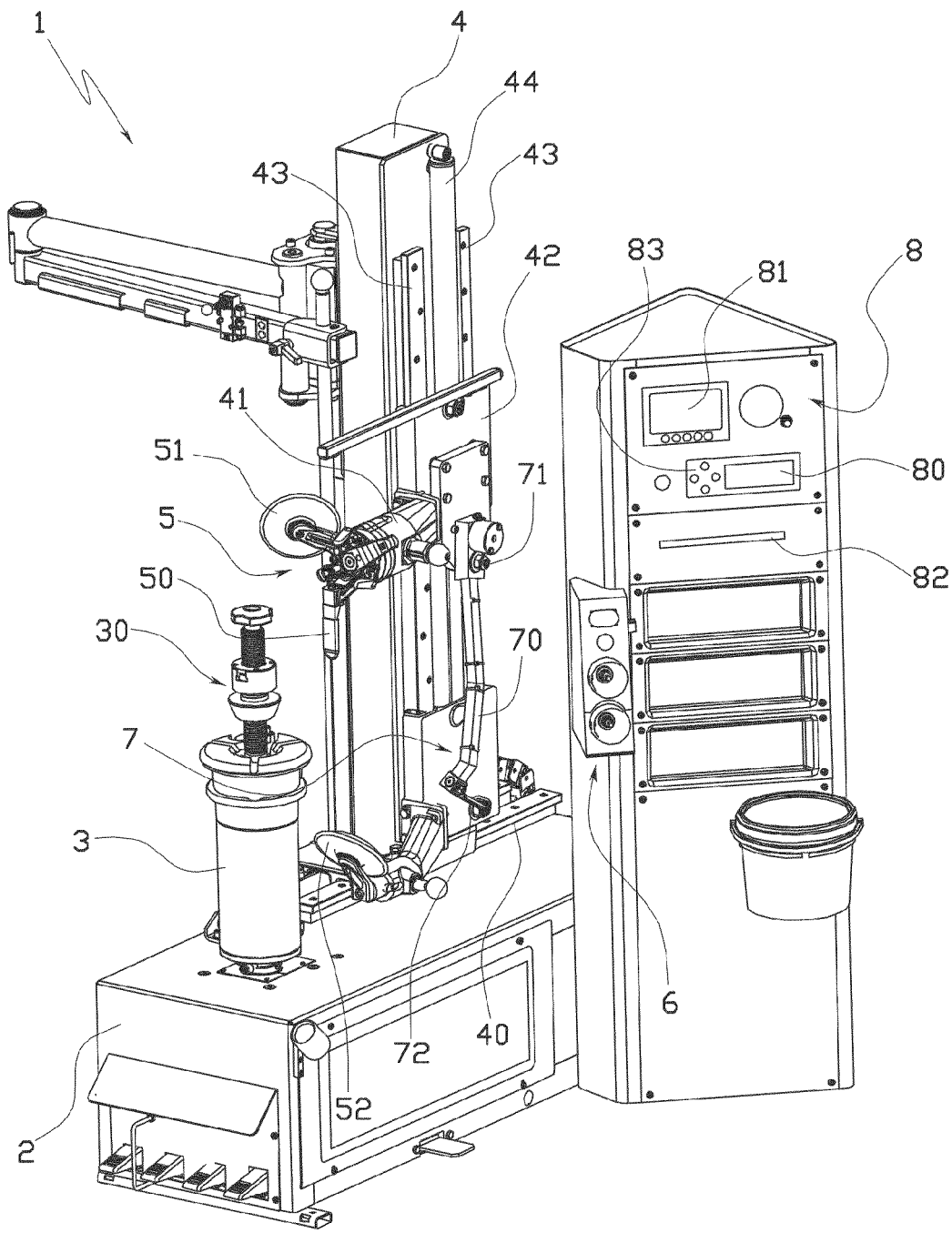
FIG. 1 is a prospective view of a tire changing machine equipped with the device of the invention.
Figure 2:
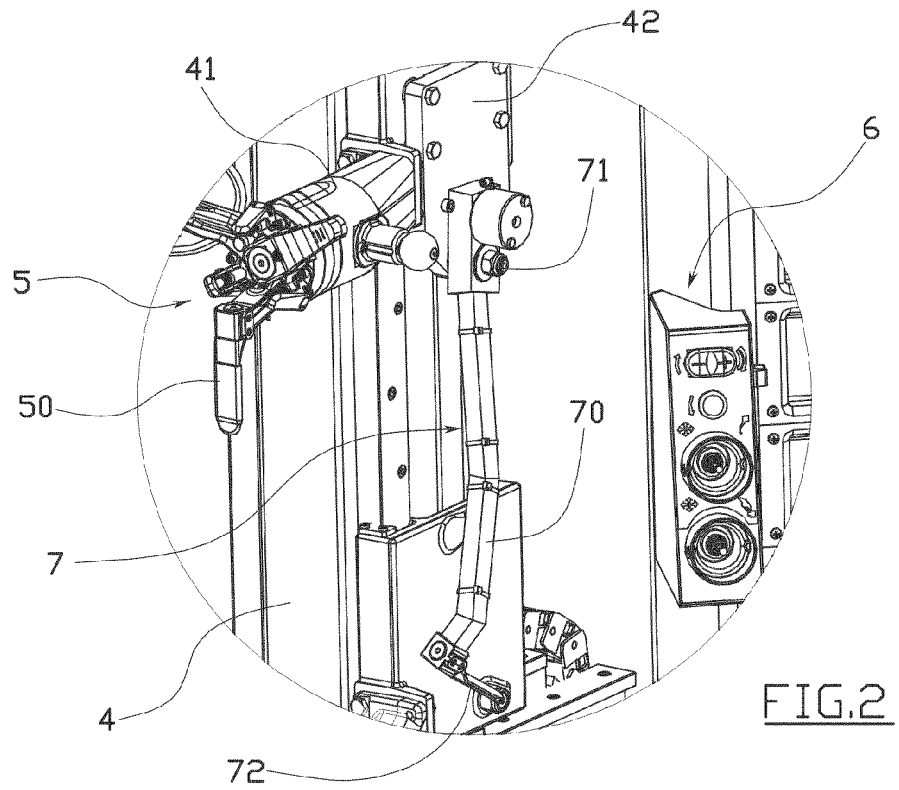
FIG. 2 is an enlarged detail of FIG. 1.
Figure 3:
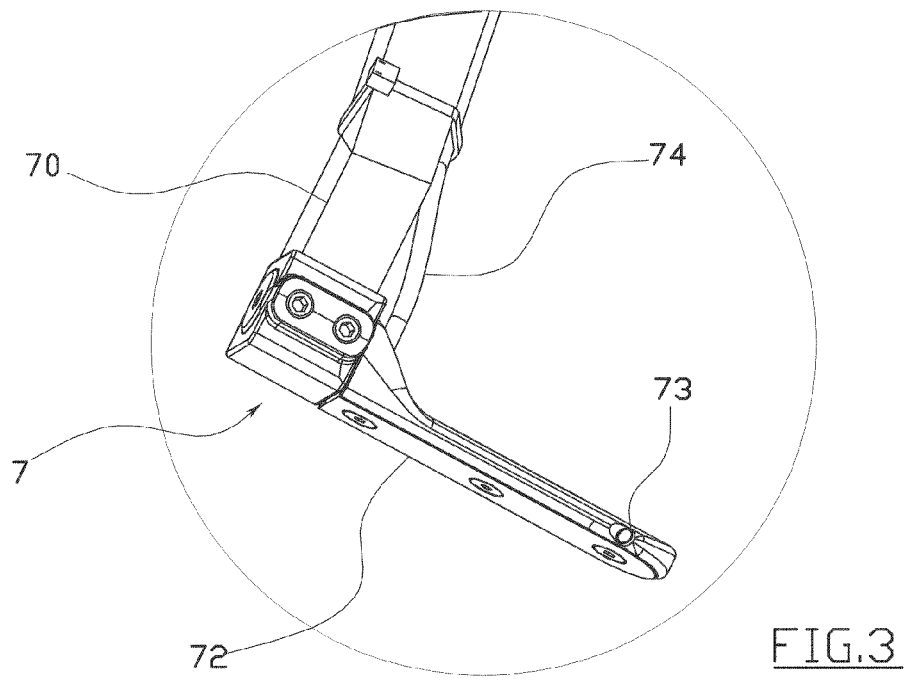
FIG. 3 is an enlarged detail of the device of the invention.

The device 7 comprises a profiled arm 70 hinged to the carriage 42 by a horizontal pin 71 which enables the arm 70 to be rotated between an idle position when it is aligned with the edge of the column 4 (see FIG. 1), and a raised operating position when it projects towards a wheel 100 fitted on the rotor 3 (see FIG. 4).

The free end of the profiled arm 70 has a thin transverse probe 72, generally flat and narrow in shape, oriented vertically and projecting downwards when the profiled arm 70 is in the raised position.

A micro camera 73 is installed inside and at the lower extremity of the transverse probe 72, connected to an electronic processor 8, for example a personal computer.

In the example illustrated, the connection between the micro camera 73 and the electronic processor 8 is achieved via a cable 74, but it could be achieved with a fibre optic conductor or any other suitable means.

The transverse probe 72 preferably incorporates means for illuminating (not shown in the figures) to light the space that is photographed by the micro camera 73, for example LED light sources or fibre optic illumination.

The electronic processor 8 has a mass memory 80 for memorizing data and is connected both to a printer 82 for paper print outs, and to a display 81, in the example an LCD monitor.

In the electronic processor 8, suitable algorithms can be implemented for the processing of the images acquired by the micro camera 73.

The electronic processor 8 is also associated to a keyboard 83 for the selection of the display programs.

During operation the wheel 100 is mounted on the wheel rotor shaft 3 where the bead is initially broken with the use of the bead breaker disc 51, which can cooperate with an analogous bead breaker disc 52 located on the other side of the wheel 100.

Bead breaking is a well known operation in which the tire bead 101 is detached from the rim flange 102 to which it is normally engaged.

After completing bead breaking the profiled arm 70 of the device 7 is raised into the operating position and the sliding carriage 42 is moved to a height such that the transverse probe 72 is above the upper sidewall of the tire 101 of the wheel 100.

Figure 5:
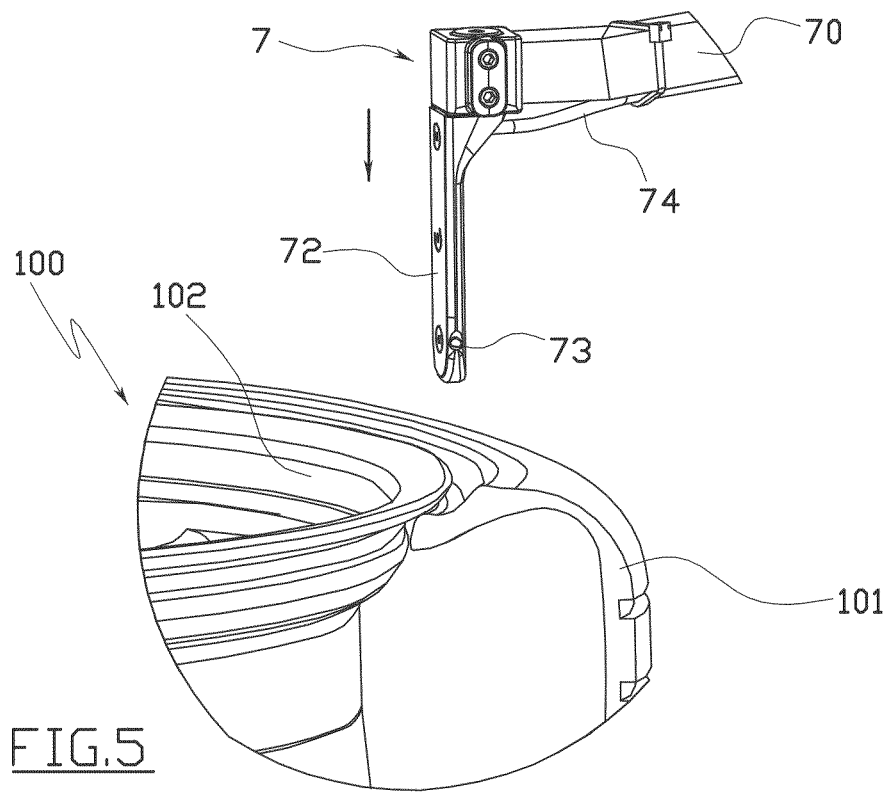
FIGS. 5 to 7 illustrate a portion of a rim during different stages of operation of the device of the invention.

Exploiting the horizontal movement of the column 4 on the rectilinear guide 40, the transverse probe 72 is vertically aligned with a portion of the tire sidewall 101 adjacent to the rim flange 102, as in FIG. 5.

Figure 6:
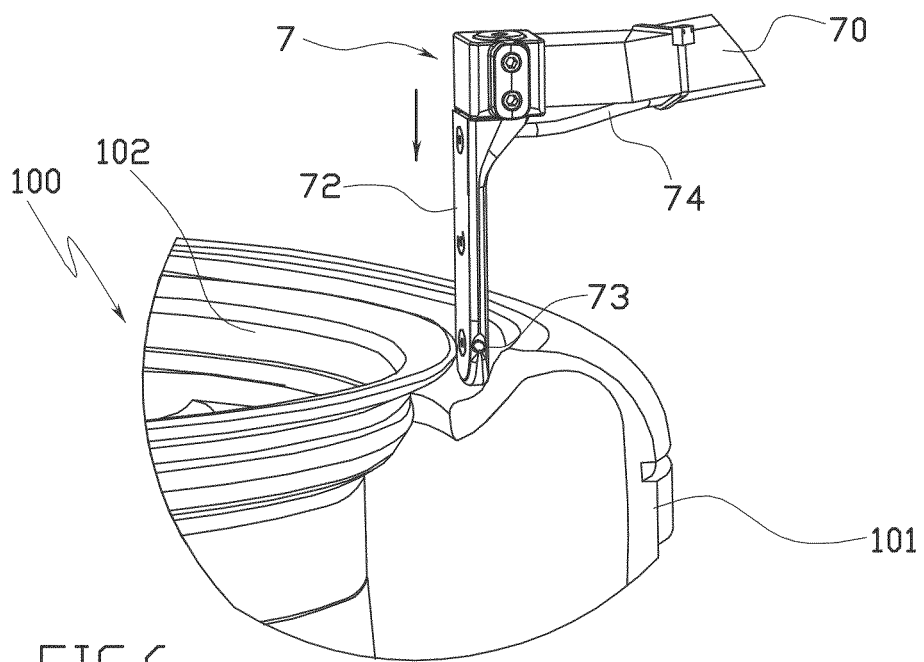

Subsequently the sliding carriage 42 is progressively lowered such that the transverse probe 72 comes into contact with and pushes the tire sidewall 101 such that it flexes towards the inside of the rim well 102 as in FIG. 6.

Figure 7:
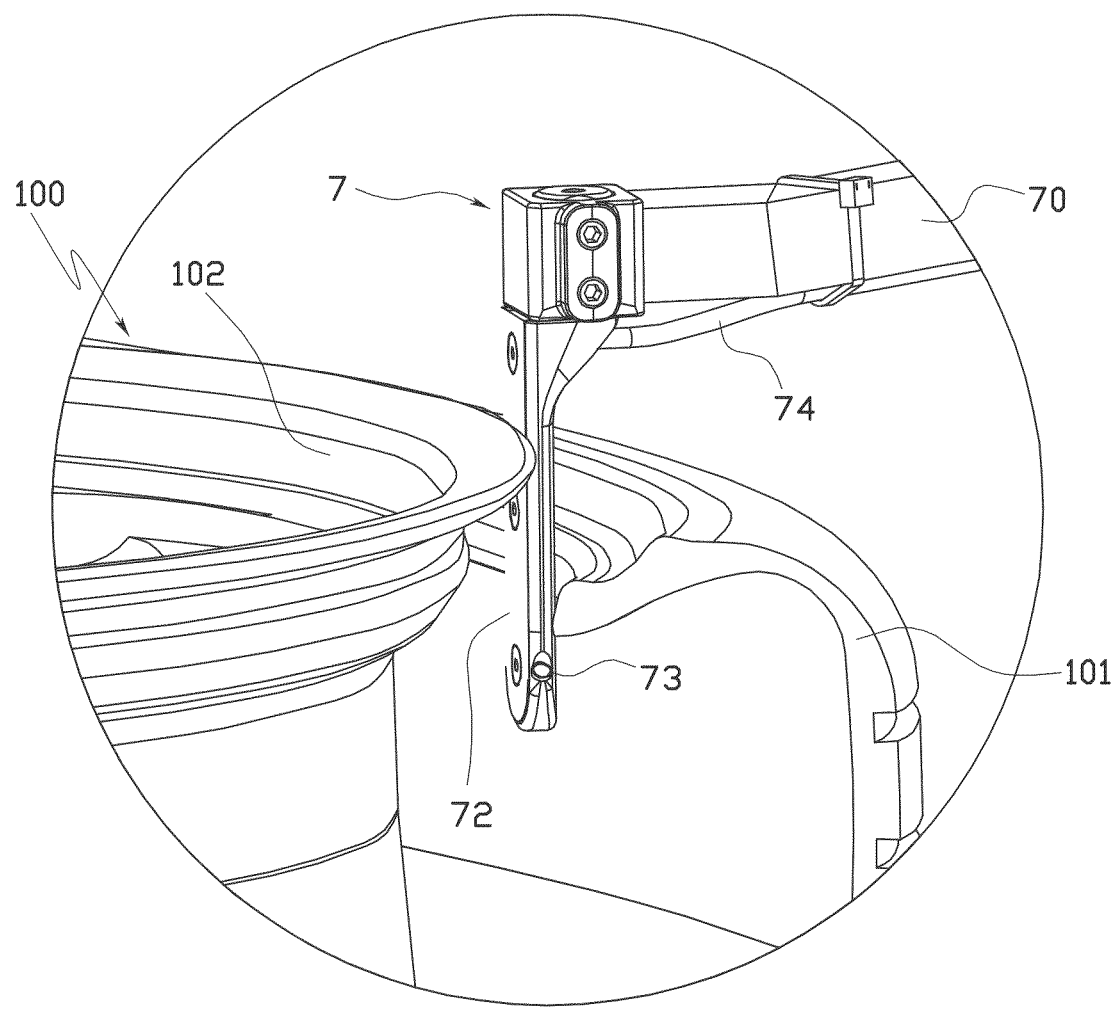

The lowering of the carriage 42 terminates when the transverse probe 72 inserts between the rim flange 102 and the tire bead 101 as in FIG. 7.

In this configuration the extremity of the transverse probe 72 with the micro camera 73 and the means for illuminating are positioned inside the volume defined by the rim well 102 and the inside tire wall 101.

The means for illuminating and the micro camera 73 are then simultaneously activated in order to acquire images of the internal volume of the wheel 100.

Depending on the purpose for which the device 7 is used, the micro camera 73 can be used to acquire images of the internal surfaces of the tire 101, of the rim 102, or of both.

During image acquisition the wheel support rotor 3 can be put into operation such that the wheel 100 rotates on its axis and the micro camera 73, equipped on the transverse probe 72 which remains stationary, acquires images of the internal surfaces of the tire 101 and/or of the rim 102 for the entire development of the circumference.

During the rotation of the wheel 100, the smooth shape and limited dimensions of the transverse probe 72 prevent damage to the tire 101 or the rim flange 102.

A possible use of the device 7 is to assess, after the mounting procedure of UHP and Run-Flat type tires, the state of the internal bead in order to identify the presence of any damage to the tire that might cause sudden deflation.

This assessment can be made by simply viewing the images acquired by the micro camera 73 on the screen 81, such that the operator can visually establish the state of internal wear of the tire 101 or the presence of any damage to the tire 101 or tire bead.

To facilitate the operator, the screen 81 can simultaneously display sample images, memorized previously in the mass memory unit 80, that illustrate various types of damage and/or various levels of wear observable on a tire and/or an image of a tire in perfect condition.

Figure 8:
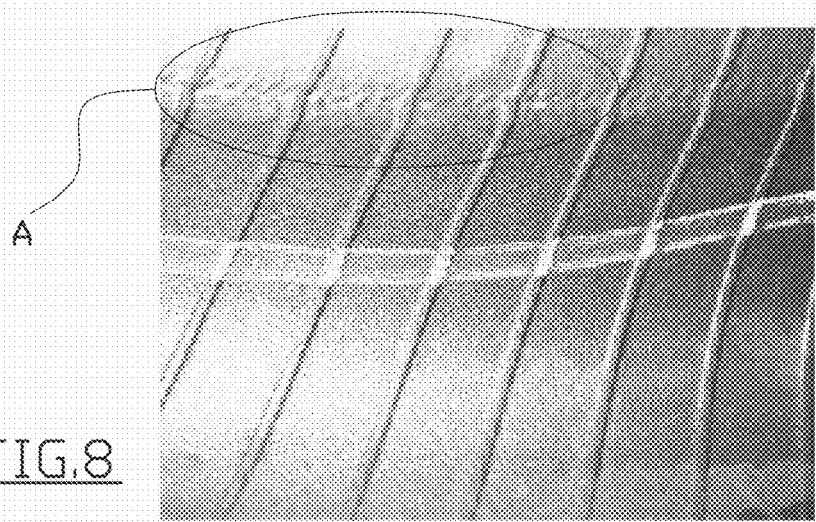
FIGS. 8, 9, and 10 illustrate three examples of possible damage to an inside surface of a tire.
Figure 9:
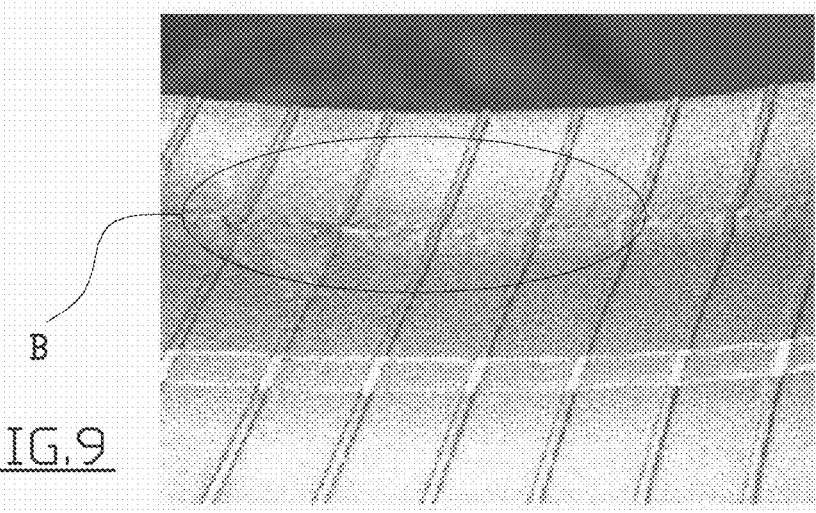
Figure 10:
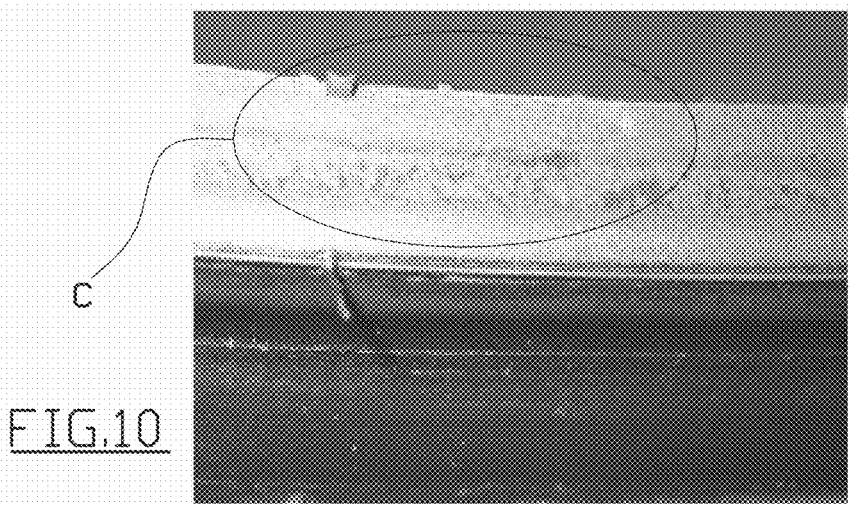

For example, FIGS. 8, 9, and 10 show sample images of two types of laceration observable on the internal surface of a tire 101, indicated by the ellipses A, B, and C.

In this way the operator can compare the images acquired with the micro camera 73 with the sample images and easily establish the presence of any damage and the degree of wear.

Alternatively, the images acquired by the micro camera 73 can be processed using specific artificial viewing algorithms performed by the electronic processor 8, making it possible to automatically identify and signal the presence of damage and/or the state of wear of the tire 101.

This identification can be made for example using algorithms that can identify predefined shapes in the images, for example edge-detection algorithms, using systems like neural nets, fuzzy logic, genetic systems, or the like, which might in turn include self-learning procedures.

All the information acquired by the micro camera 73 in the form of still images or rapid image sequences (video) can be printed by the printer 82 or memorised in the mass memory unit 80 for processing or subsequent use.

The device 7 can also be used to detect the internal profile of the rim 102 or tire 101, for example with appropriate artificial vision algorithms.

Further, the device 7 can be used for the purpose of deciding on the best methods for bead braking, demounting, and mounting of individual tires 101 on the tire changing machine 1, so that for example the tools 50 and 51 could be automatically maneuvered on the basis of a measured profile of the rim 102 and/or of the tire 101.

Obviously a technical expert in the sector could introduce numerous modifications of a practical-technical nature to the device 7 described above, without forsaking the ambit of the invention as claimed below.

In particular, the device 7 can be associated not only to a tire changing machine 1, but also to other wheel service machines, like for example wheel balancing or wheel trim adjustment machines.

The invention claimed is:

1. A device for obtaining information about a wheel (100), comprising a penetrating body (72) for being at least partially inserted between a tire (101) and a rim (102) of a wheel (100), and a unit (73) for acquiring images installed in a portion of the penetrating body (72) designed to be located internally of the tire (101), in a position between the tire (101) and the rim (102), wherein the penetrating body (72) is flat and narrow in shape to define a probe insertable between the rim flange and the tire bead, wherein the device comprises a profiled arm (70) hinged to a carriage, and wherein the penetrating body (72) is attached to a free end of the profiled arm (70).

2. The device of claim 1, wherein the unit for acquiring images comprise a micro camera (73).

3. The device of claim 1, further comprising a device for illuminating which are installed on the portion of the penetrating body (72) destined to be located internally of the tire (101) between the tire (101) and the rim (102).

4. The device of claim 1, wherein the unit (73) for acquiring images are connected to a device (81, 82) for displaying the images.

5. The device of claim 1, wherein the unit (73) for acquiring images are connected to an electronic processor (8).

6. The device of claim 1, further comprising first rotating support device (3) for a wheel (100), and second support and movement device (4, 42, 70) for at least partially inserting the penetrating body (72) between the tire (101) and the rim (102) of the wheel (100), and for holding the penetrating body (72) stationary during rotation of the wheel (100).

7. A method for obtaining information about a wheel (100) comprising stages of insertion of a penetrating body (72) between the tire (101) and a rim (102) of the wheel (100), and acquiring images using a unit for acquiring (73) installed on the penetrating body (72) designed to be located internally of the tire (101), wherein the penetrating body (72) is flat and narrow in shape to define a probe inserted between the rim flange and the tire bead, wherein the penetrating body (72) is attached to a free end of a profiled arm (70) hinged to a carriage, wherein said stage of insertion of the penetrating body and of acquiring the images are carried out after completing a stage of bead braking.

8. The method of claim 7, comprising an additional stage of illuminating using a unit for illuminating installed on the penetrating body (72) designed to be located internally of the tire (101).

9. The method of claim 7, comprising a stage of rotating the wheel (100) relative to the penetrating body (72), during the acquisition of images by the unit for acquiring (73).

10. The method of claim 7, further comprising a stage of comparing the images acquired by the unit for acquiring (73) installed on the penetrating body (72) designed to be located internally of the tire (101) with sample images.

11. The method of claim 7, further comprising a stage of processing the images acquired by the unit for acquiring (73) installed on the penetrating body (72) designed to be located internally of the tire (101) using artificial vision algorithms.

* * * * *